United States Patent
Kanzaki

(10) Patent No.: US 10,162,148 B2
(45) Date of Patent: Dec. 25, 2018

(54) WIDE ANGLE LENS

(71) Applicant: NIDEC SANKYO CORPORATION, Nagano (JP)

(72) Inventor: Yosuke Kanzaki, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 15/717,948

(22) Filed: Sep. 28, 2017

(65) Prior Publication Data

US 2018/0095237 A1  Apr. 5, 2018

(30) Foreign Application Priority Data

Sep. 30, 2016  (JP) .................... 2016-194138

(51) Int. Cl.
| | |
|---|---|
| G02B 7/02 | (2006.01) |
| G02B 9/62 | (2006.01) |
| G02B 13/06 | (2006.01) |
| G02B 9/60 | (2006.01) |

(52) U.S. Cl.
CPC ............... *G02B 7/028* (2013.01); *G02B 9/60* (2013.01); *G02B 9/62* (2013.01); *G02B 13/06* (2013.01)

(58) Field of Classification Search
CPC .................................................... G02B 7/028
USPC ......................................................... 359/762
See application file for complete search history.

(56) References Cited

U.S. PATENT DOCUMENTS

2010/0277816 A1  11/2010  Kweon et al.
2016/0077313 A1* 3/2016  Komiyama ............ G02B 13/06
                                                            359/752

FOREIGN PATENT DOCUMENTS

| CN | 105807404 | 7/2016 |
| JP | 4947700 | 6/2012 |
| WO | 2009084842 | 7/2009 |

OTHER PUBLICATIONS

"Search Report of European Counterpart Application," dated Feb. 16, 2018, p. 1-p. 6, in which the listed references were cited.

* cited by examiner

*Primary Examiner* — James Jones
(74) *Attorney, Agent, or Firm* — JCIPRNET

(57) ABSTRACT

A wide angle lens includes a first to a third lenses, a diaphragm, a fourth to a sixth lenses disposed in order from an object side. The fourth lens is a glass lens, and the second lens, the third lens, the fifth lens and the sixth lens are plastic lenses. The fifth lens and the sixth lens constitute a cemented lens. When a center curvature radius on an image side face of the fourth lens is "R42" and a focal length of an entire wide angle lens is "f0", the center curvature radius "R42" and the focal length "f0" satisfy the conditional expression: $2 \times f0 \leq |R42| \leq 5 \times f0$. When a center curvature radius on an object side face of the fourth lens is "R41", the center curvature radii "R41" and "R42" may satisfy the conditional expression: $|R41| \geq |R42|$.

13 Claims, 5 Drawing Sheets

WIDE ANGLE LENS

CROSS REFERENCE TO RELATED APPLICATION

The present invention claims priority under 35 U.S.C. § 119 to Japanese Application No. 2016-194138 filed Sep. 30, 2016, the entire content of which is incorporated herein by reference.

FIELD OF THE INVENTION

The present invention relates to a wide angle lens which is mounted on a vehicle or the like.

BACKGROUND

A wide angle and a high resolution are required in a wide angle lens which is used in an application for capturing images in a vehicle or the like, and stable temperature characteristics are also required. When a wide angle lens is constituted of plastic lenses, sufficient temperature characteristics cannot be obtained and, when a wide angle lens is constituted of glass lenses, although temperature characteristics can be improved, its component costs are increased. A wide angle lens has been proposed in which a first lens, a second lens, a third lens, a diaphragm, a fourth lens, a fifth lens and a sixth lens are disposed in order from an object side, and the second lens, the third lens and the fourth lens are plastic lenses, and the first lens, the fifth lens and the sixth lens are glass lenses (see Patent Literature 1, Japanese Patent No. 4947700).

A wide angle lens mounted on a vehicle or the like is required to have stable characteristics over a wide temperature range so as to be capable of coping with ambient temperature. However, in the wide angle lens described in Patent Literature 1, the third lens and the fourth lens disposed on both sides of the diaphragm are plastic lenses and thus stable characteristics cannot be obtained over a wide temperature range.

SUMMARY

In view of the problem described above, the present invention provides a wide angle lens which is capable of obtaining stable characteristics over a wide temperature range while using plastic lenses and a glass lens. In other words, the present invention provides a wide angle lens which is capable of obtaining stable characteristics over a wide temperature range while using plastic lenses.

To solve the above-mentioned problem, the present invention provides a wide angle lens comprising a first lens, a second lens, a third lens, a diaphragm, a fourth lens, a fifth lens and a sixth lens which are disposed in order from an object side. The first lens is a negative meniscus lens whose convex surface is directed to the object side, the second lens is a negative meniscus lens whose convex surface is directed to the object side, the third lens is a positive meniscus lens whose concave surface is directed to the object side, the fourth lens is a positive lens whose convex surfaces are directed to the object side and an image side, the fifth lens is a negative lens whose concave surfaces are directed to the object side and the image side, and the sixth lens is a positive lens whose convex surfaces are directed to the object side and the image side. The fourth lens is a glass lens, the second lens, the third lens, the fifth lens and the sixth lens are plastic lenses, the fifth lens and the sixth lens constitute a cemented lens which is constituted so that an image side face of the fifth lens and an object side face of the sixth lens are joined to each other with an adhesive and, when a center curvature radius on an image side face of the fourth lens is "R42" and a focal length of an entire wide angle lens is "f0", the center curvature radius "R42" and the focal length "f0" satisfy the following conditional expression:

$$2 \times f0 \leq |R42| \leq 5 \times f0.$$

In the present invention, plastic lenses and a glass lens are used together and thus the cost can be reduced in comparison with a case that the entire wide angle lens is constituted of glass lenses. Further, one (fourth lens) of the lenses (third lens and fourth lens) disposed on both sides of a diaphragm is a glass lens and thus the temperature characteristic can be improved. Further, the center curvature radius "R42" of the image side face of the fourth lens and the focal length "f0" of the entire wide angle lens satisfy the following conditional expression:

$$2 \times f0 \leq |R42| \leq 5 \times f0.$$

Therefore, an angle formed by the outermost light of a light flux and an image side face of the fourth lens is close to a right angle. Accordingly, a moving amount of a focal point when the temperature is varied can be reduced and a variation amount of a viewing angle when the temperature is varied can be reduced. As a result, a stable characteristic can be obtained over a wide temperature range.

In the present invention, it may be adopted that, when a center curvature radius on an object side face of the fourth lens is "R41", the center curvature radii "R41" and "R42" satisfy the following conditional expression:

$$|R41| \geq |R42|.$$

According to this structure, various aberrations can be corrected appropriately.

In the present invention, it may be adopted that the first lens is a glass lens. According to this structure, the object side face of the first lens located on the outermost side is hard to be scratched.

In the present invention, it may be adopted that, when a center thickness of the sixth lens is "T6" and a peripheral thickness of a light effective area on an object side face of the sixth lens is "C6", the center thickness "T6" and the peripheral thickness "C6" satisfy the following conditional expression:

$$2 \leq (T6/C6) \leq 3.$$

In a case that the first lens is a glass lens, basically, as the Abbe number becomes larger, the magnification chromatic aberration can be reduced. However, in a case that the Abbe number is large, the refractive index becomes small and thus an effective diameter of the first lens is required to be increased. Even in this case, there may be a case that an effective diameter of the first lens is required to reduce due to a restriction of an outer diameter dimension of the lens unit and, in this case, the chromatic aberration becomes large. However, when the center thickness "T6" and the peripheral thickness "C6" of the sixth lens satisfy the following conditional expression, the chromatic aberration can be corrected appropriately:

$$2 \leq (T6/C6) \leq 3.$$

In the present invention, it may be adopted that an Abbe number "ν5" of the fifth lens and an Abbe number "ν6" of the sixth lens satisfy the following conditional expression:

$v5 \leq 30$, and $v6 \geq 50$.

According to this structure, the chromatic aberration can be corrected appropriately.

In the present invention, it may be adopted that an object-image distance "D" and the focal length "f0" satisfy the following conditional expression:

$10 < D/f0 < 18$.

According to this structure, corrections of the spherical aberration and the distortion aberration can be performed easily and a dimension (object-image distance) in the optical axis direction of the wide angle lens can be shortened.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Embodiments of a wide angle lens to which the present invention is applied will be described below with reference to the accompanying drawings. In the following descriptions, "La" is indicated on an object side and "Lb" is indicated on an image side in a direction where an optical axis "L" is extended.

First Embodiment (Entire Constitution)

Figure 1:
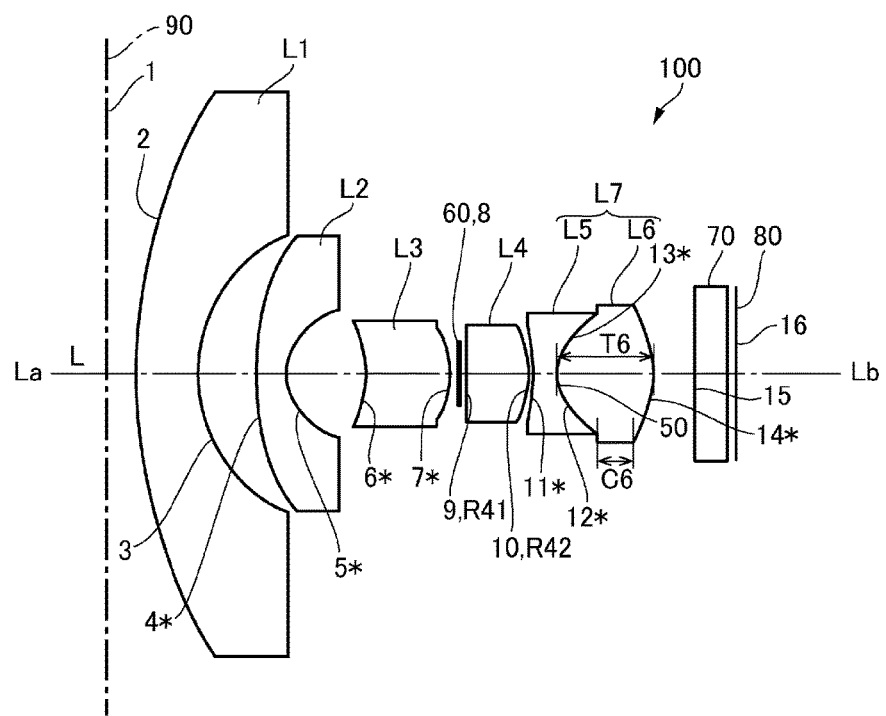
FIG. 1 is an explanatory view showing a constitution of a wide angle lens in accordance with a first embodiment of the present invention.

FIG. 1 is an explanatory view showing a constitution of a wide angle lens 100 in accordance with a first embodiment of the present invention. Table 1 indicates lens data of the wide angle lens 100 in accordance with the first embodiment of the present invention. Regarding indication of respective faces 1 through 16 in FIG. 1, the mark "*" is added to an aspherical surface. Further, in upper columns in Table 1, a center curvature radius, a thickness, a refractive index "nd", an Abbe number "vd", a conical coefficient "K", and a linear expansion coefficient of each of the faces are indicated, and units of a center curvature radius and a thickness are "mm". In a case that a lens face is a convex surface which is protruded toward the object side "La" or a concave surface which is recessed toward the object side "La", a center curvature radius is expressed as a positive value and, in a case that a lens face is a convex surface which is protruded toward the image side "Lb" or a concave surface which is recessed toward the image side "Lb", the center curvature radius is expressed as a negative value. Further, in lower columns in Table 1, aspherical coefficients A4, A6, A8, A10, . . . are indicated when a shape of an aspherical surface is expressed as an equation described below (Equation 1).

TABLE 1

| Face No. | | Center Curvature Radius | Thickness | Refractive Index nd | Abbe Number vd | Conical Coefficient K | Linear Expansion Coefficient TCE × 10^−6 |
|---|---|---|---|---|---|---|---|
| 1 | | Infinity | Infinity | | | | |
| 2 | LENS-L1 | 12.00000 | 1.300 | 1.8348 | 42.72 | | 60 |
| 3 | | 3.07000 | 1.268 | | | | 26 |
| 4 | LENS-L2 | 35.97654 | 0.600 | 1.5123 | 56.3 | 0 | 62 |
| 5 | | 1.61286 | 1.613 | | | −3.05E−01 | 62 |
| 6 | LENS-L3 | −3.23876 | 1.800 | 1.6355 | 23.97 | 0 | 62 |
| 7 | | −1.76732 | 0.194 | | | 0 | 60 |
| 8 | Diaphragm | Infinity | 0.052 | | | | 26 |
| 9 | LENS-L4 | 6.89000 | 1.240 | 1.6968 | 55.46 | | 70 |
| 10 | | −2.42000 | 0.072 | | | | 26 |
| 11 | LENS-L5 | −4.26631 | 0.500 | 1.6355 | 23.97 | 0 | 66 |
| 12 | Adhesive | 0.82418 | 0.010 | 1.4858 | 56.09 | −1.36E+00 | 60 |
| 13 | LENS-L6 | 0.82418 | 2.010 | 1.5439 | 56.19 | −1.36E+00 | 62 |
| 14 | | −1.80866 | 0.850 | | | −9.83E−01 | 26 |
| 15 | | Infinity | 0.700 | 1.5168 | 64.17 | | 0 |
| 16 | | Infinity | 0.140 | | | | 26 |

| # | A4 | A6 | A8 | A10 | A12 | A14 |
|---|---|---|---|---|---|---|
| 4 | 1.81761E−02 | −1.91452E−03 | 1.05825E−04 | 6.43281E−07 | 9.41812E−08 | |
| 5 | −2.92142E−04 | 1.81342E−02 | −6.86218E−03 | 1.43121E−03 | 1.01300E−04 | |
| 6 | −4.35297E−02 | −1.28348E−03 | −6.53208E−04 | −1.36246E−03 | 1.49364E−03 | |
| 7 | 3.38767E−02 | −2.90836E−03 | 9.86034E−03 | −1.16386E−02 | 5.77244E−03 | |
| 11 | −7.46942E−03 | 1.49730E−02 | −1.09000E−02 | −2.62233E−03 | 1.72774E−03 | |

TABLE 1-continued

| 12 | 6.60830E-02 | -2.96398E-02 | 9.98074E-03 | 7.93152E-03 | -9.14541E-03 | 1.73700E-03 |
| --- | --- | --- | --- | --- | --- | --- |
| 13 | 6.60830E-02 | -2.96398E-02 | 9.98074E-03 | 7.93152E-03 | -9.14541E-03 | 1.73700E-03 |
| 14 | 4.60248E-02 | -2.64360E-03 | -3.81533E-04 | 5.84917E-05 | -8.94309E-05 | 6.60905E-05 |

In Equation 1 described below, a sag amount (axis in the optical axis direction) is "Z", a height perpendicular to the optical axis (light height) is "r", the conical coefficient is "K", and an inverse number of the center radius of curvature is "c".

$$Z = \frac{cr^2}{1 + \sqrt{1 - (1+K)c^2 r^2}} + \sum_{n=2}^{5} A_{2n} r^{2n} \quad \text{[Equation 1]}$$

As shown in FIG. 1 and Table 1, the wide angle lens 100 is comprised of a first lens "L1", a second lens "L2", a third lens "L3", a diaphragm 60, a fourth lens "L4", a fifth lens "L5" and a sixth lens "L6", which are disposed in this order from the object side "La". A flat plate-shaped filter 70 and an imaging element 80 are disposed on the image side "Lb" with respect to the sixth lens "L6". In this embodiment, the wide angle lens 100 is a stereoscopic projection type and the maximum distortion when an ideal image height is a reference is designed so as to be 20% or less in an absolute value.

The focal length "f0" (Effective Focal Length) of the entire lens system in the wide angle lens 100 is 0.876 mm, the "F"-value is 2.0, and the object-image distance (Total Track) is 12.4 mm. Further, a vertical viewing angle of the wide angle lens 100 is 150.8° and its horizontal viewing angle is 198.2°.

In FIG. 1 and Table 1, an imaginary face 90 (image) is assumed to exist on the object side "La" with respect to the first lens "L1" and the imaginary face 90 is a first face 1. Further, the eighth face 8 is formed by the diaphragm 60, the fifteenth face 15 is formed by the filter 70, and the sixteenth face 16 is formed by the imaging element 80.

(Lens Constitution)

The first lens "L1" is a negative meniscus lens (meniscus lens having a negative power) whose convex surface (second face 2) is directed to the object side "La" and its concave surface (third face 3) is directed to the image side "Lb". The second lens "L2" is a negative meniscus lens (meniscus lens having a negative power) whose convex surface (fourth face 4) is directed to the object side "La" and its concave surface (fifth face 5) is directed to the image side "Lb". The third lens "L3" is a positive meniscus lens (meniscus lens having a positive power) whose concave surface (sixth face 6) is directed to the object side "La" and its convex surface (seventh face 7) is directed to the image side "Lb". The fourth lens "L4" is a positive lens (biconvex lens having positive powers) whose convex surfaces (ninth face 9 and tenth face 10) are directed to the object side "La" and the image side "Lb". The fifth lens "L5" is a negative lens (biconcave lens having negative powers) whose concave surfaces (eleventh face 11 and twelfth face 12) are directed to the object side "La" and the image side "Lb". The sixth lens "L6" is a positive lens (biconvex lens having positive powers) whose convex surfaces (thirteenth face 13 and fourteenth face 14) are directed to the object side "La" and the image side "Lb".

Each of the convex surface (second face 2) on the object side "La" and the concave surface (third face 3) on the image side "Lb" of the first lens "L1" is a spherical surface. Each of the convex surface (fourth face 4) on the object side "La" and the concave surface (fifth face 5) on the image side "Lb" of the second lens "L2" is an aspherical surface. Each of the concave surface (sixth face 6) on the object side "La" and the convex surface (seventh face 7) on the image side "Lb" of the third lens "L3" is an aspherical surface. Each of the convex surface (ninth face 9) on the object side "La" and the convex surface (tenth face 10) on the image side "Lb" of the fourth lens "L4" is a spherical surface. Each of the concave surface (eleventh face 11) on the object side "La" and the concave surface (twelfth face 12) on the image side "Lb" of the fifth lens "L5" is an aspherical surface. Each of the convex surface (thirteenth face 13) on the object side "La" and the convex surface (fourteenth face 14) on the image side "Lb" of the sixth lens "L6" is an aspherical surface. In this embodiment, the fifth lens "L5" and the sixth lens "L6" constitute a cemented lens "L7" in which the concave surface (twelfth face 12) on the image side "Lb" of the fifth lens "L5" and the convex surface (thirteenth face 13) on the object side "La" of the sixth lens "L6" are joined to each other with an adhesive 50. Therefore, a face on the object side "La" of the adhesive 50 (concave surface on the image side "Lb" of the fifth lens "L5") is the twelfth face 12.

In this embodiment, the fourth lens "L4" is a glass lens and the material whose temperature coefficient of a refractive index is linearly varied in a range of −40° C. through +120° C. is used for the fourth lens "L4". The second lens "L2", the third lens "L3", the fifth lens "L5" and the sixth lens "L6" are plastic lenses made of material such as acrylic-based resin, polycarbonate-based resin or polyolefin-based resin. The first lens "L1" may be either a glass lens or a plastic lens. In this embodiment, the first lens "L1" is a glass lens. Therefore, even when the convex surface (second face 2) on the object side of the first lens "L1" located on the outermost side is exposed, the first lens "L1" is hard to be scratched.

(Detailed Constitution of Lenses)

In the wide angle lens 100, a center curvature radius "R42" of the convex surface (tenth face 10) on the image side "Lb" of the fourth lens "L4" is −2.42 mm. Further, the focal length "f0" of the entire wide angle lens 100 (effective focal length) is 0.876 mm. Therefore, the center curvature radius "R42" and the focal length "f0" satisfy the following first conditional expression:

$(2 \times f0) = 1.752 \leq |R42| = 2.42 \leq (5 \times f0) = 4.38.$

In this case, the center curvature radius "R42" of the convex surface (ninth face 9) on the image side "Lb" of the fourth lens "L4" made of a glass lens is not less than $(2 \times f0)$ and thus molding of glass is easily performed and the lens face is easily formed by polishing.

Further, the center curvature radius "R41" of the convex surface (ninth face 9) on the object side "La" of the fourth lens "L4" is 6.89 mm. Therefore, the center curvature radii "R41" and "R42" satisfy the following second conditional expression:

$|R41| = 6.89 \geq |R42| = 2.42.$

Further, the center thickness "T6" of the sixth lens "L6" is 2.01 mm, and the peripheral thickness "C6" of a light effective area of the convex surface (thirteenth face 13) on the object side "La" of the sixth lens "L6" is 0.72 mm. Therefore, the center thickness "T6" and the peripheral thickness "C6" satisfy the following third conditional expression:

2≤(T6/C6)=2.79≤3.

In this embodiment, the refractive index "nd" and the Abbe number "vd" of the first lens "L1" made of a glass lens are respectively 1.8348 and 42.72. On the other hand, lens material whose temperature coefficient of a refractive index is linearly varied in a range of −40° C. through +120° C. is selected for the fourth lens "L4" made of a glass lens and thus the refractive index "nd" and the Abbe number "vd" of the fourth lens "L4" are respectively 1.6968 and 55.46. As a result, the first lens "L1" and the fourth lens "L4" satisfy the following condition:

the refractive index "nd" of the first lens "L1">the refractive index "nd" of the fourth lens "L4", and the Abbe number "vd" of the first lens "L1"<the Abbe number "vd" of the fourth lens "L4".

Further, the Abbe number "v5" of the fifth lens "L5" is 23.97, and the Abbe number "v6" of the sixth lens "L6" is 56.19. Therefore, the Abbe number "v5" of the fifth lens "L5" and the Abbe number "v6" of the sixth lens "L6" satisfy the following fourth conditional expression:

v5≤30, and v6≥50.

Therefore, the chromatic aberration can be corrected appropriately.

Further, the object-image distance "D" is 12.4 mm and the focal length "f0" of the entire lens system is 0.876 mm. Therefore, the object-image distance "D" and the focal length "f0" of the entire lens system satisfy the following fifth conditional expression:

10<D/f0=14.155<18.

In this case, the "D/f0" is larger than 10 and thus corrections of the spherical aberration and the distortion aberration can be performed easily. Further, the "D/f0" is less than 18 and thus a dimension (object-image distance) in the optical axis direction of the wide angle lens 100 can be shortened.

(Chromatic Aberration Characteristics)

Table 2 shows chromatic aberrations (axial chromatic aberration and magnification chromatic aberration) of the wide angle lens 100 in accordance with the first embodiment of the present invention. Table 2 shows axial chromatic aberrations and magnification chromatic aberrations at an end part of a viewing angle in a vertical direction ("V"-end: real image height=1.344 mm), an end part of a viewing angle in a horizontal direction ("H"-end: real image height=1.792 mm), and an end part in a diagonal viewing angle (maximum viewing angle) (real image height=1.926 mm) when a light of wavelength 546 nm is a reference. As shown in Table 2, in the wide angle lens 100 in this embodiment, the chromatic aberrations are small over the substantially entire range of a visible region from a blue light (wavelength 473 nm) to a red light (wavelength 668 nm).

TABLE 2

546 nm Reference Unit: μm

| Wavelength | Axial Chromatic | Magnification Chromatic Aberration | | |
|---|---|---|---|---|
| nm | Aberrartion | "V"-end | "H"-end | Maximum |
| 408 | 50.6 | −16.6 | −17.1 | −26.6 |
| 473 | 10.8 | −0.2 | 1.2 | −1.6 |
| 538 | 0.8 | −0.4 | −0.4 | −0.7 |
| 600 | −3.8 | 3.0 | 3.4 | 5.3 |
| 668 | −5.4 | 5.4 | 6.3 | 9.9 |

※ "V"-end: Real Image Height 1.344 mm
※ "H"-end: Real Image Height 1.792 mm
※ Maximum: Real Image Height 1.926 mm (Viewing Angle-Temperature Characteristic)

Table 3 shows viewing angle-temperature characteristics of the wide angle lens 100 in accordance with the first embodiment of the present invention and shows variations of a viewing angle from the temperature of 25° C. which is a design reference. As shown in Table 3, in the wide angle lens 100 in this embodiment, variations of a vertical viewing angle, a horizontal viewing angle and a diagonal viewing angle are small over a wide temperature range from −40° C. to +115° C.

TABLE 3

| Temperature (° C.) | Vetical Viewing Angle (deg) | Horizontal Viewing Angle (deg) | Diagonal Viewing Angle (deg) |
|---|---|---|---|
| −40 | 0.80 | 1.15 | 2.14 |
| −30 | 0.66 | 0.94 | 1.72 |
| 0 | 0.29 | 0.39 | 0.69 |
| 25 | 0.00 | 0.00 | 0.00 |
| 55 | −0.33 | −0.44 | −0.75 |
| 80 | −0.62 | −0.85 | −1.41 |
| 105 | −0.95 | −1.33 | −2.19 |
| 115 | −1.10 | −1.56 | −2.56 |

(MTF Characteristics)

Figure 2A:
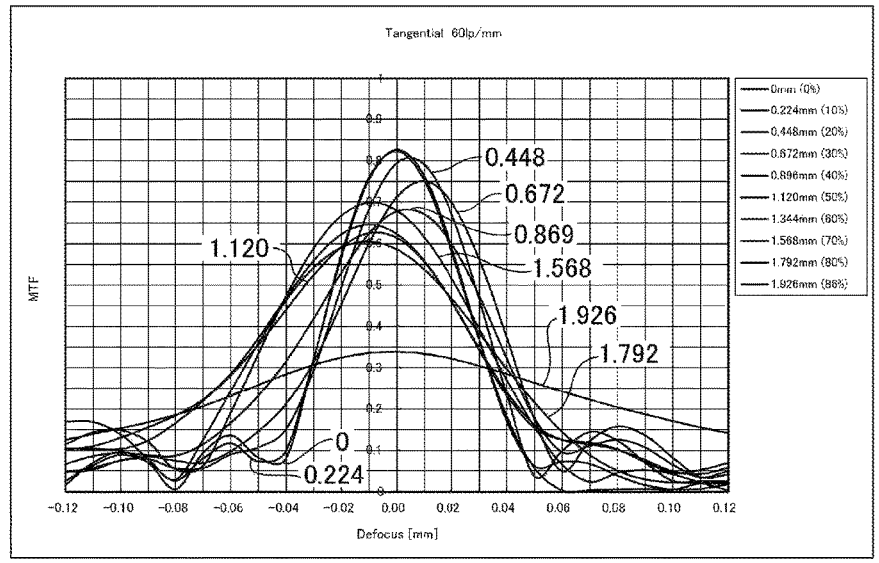
FIGS. 2A and 2B are graphs showing MTF characteristics of a wide angle lens in accordance with a first embodiment of the present invention.
Figure 2B:
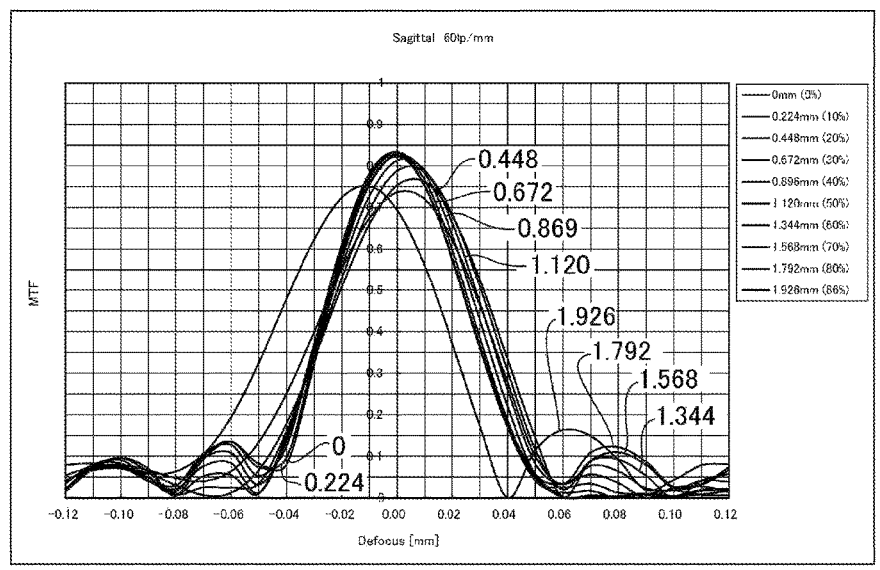
Figure 3A:
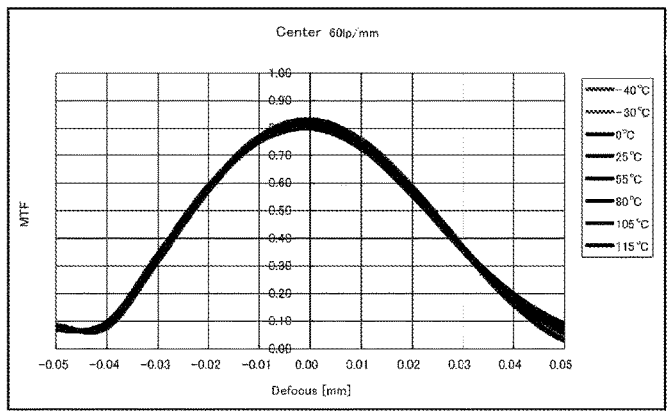
FIGS. 3A, 3B and 3C are graphs showing temperature characteristics of MTF characteristics of a wide angle lens in accordance with a first embodiment of the present invention.
Figure 3B:
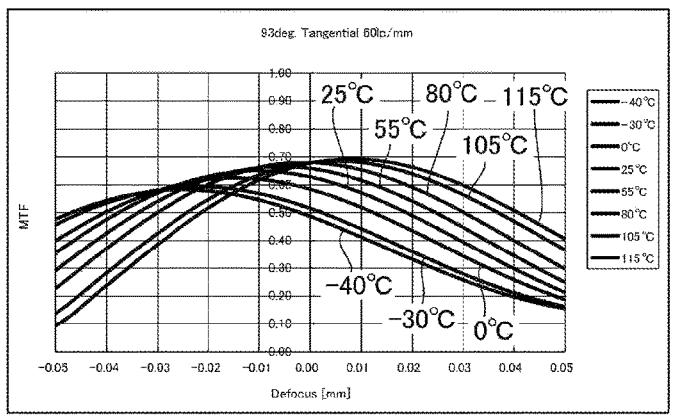
Figure 3C:
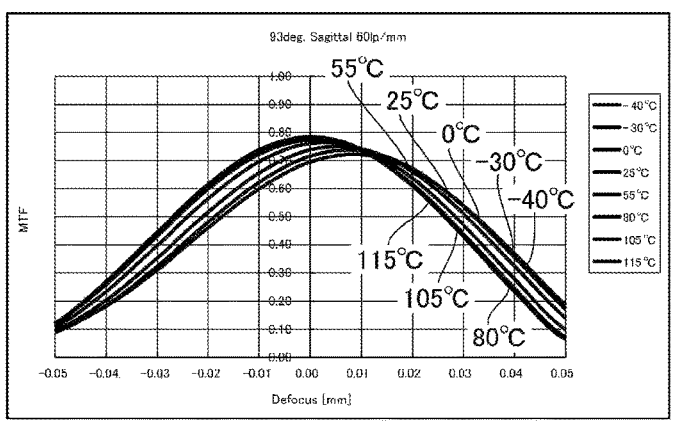

FIGS. 2A and 2B are graphs showing MTF characteristics of the wide angle lens 100 in accordance with the first embodiment of the present invention. FIG. 2A is a graph showing MTF (Modulation Transfer Function) characteristics in a tangential direction and FIG. 2B is a graph showing MTF characteristics in a sagittal direction. FIGS. 3A, 3B and 3C are graphs showing temperature characteristics of MTF characteristics of the wide angle lens 100 in accordance with the first embodiment of the present invention. FIG. 3A is a graph showing temperature characteristics of MTF characteristics at the center, FIG. 3B is a graph showing temperature characteristics of MTF characteristics in a tangential direction at the viewing angle of 93°, and FIG. 3C is a graph showing temperature characteristics of MTF characteristics in a sagittal direction at the viewing angle of 93°. In FIGS. 2A and 2B, MTF characteristics are shown in which image heights (viewing angle) are 0 mm (0%), 0.224 mm (10%), 0.448 mm (20%), 0.672 mm (30%), 0.896 mm (40%), 1.120 mm (50%), 1.344 mm (60%), 1.568 mm (70%), 1.792 mm (80%), and 1.928 mm (86%). In FIGS. 3A, 3B and 3C, characteristics are shown at respective temperatures of −40° C., −30° C., 0° C., +25° C., +55° C., +80° C., +105'C and +115° C.

As shown in FIGS. 2A and 2B, the wide angle lens 100 in this embodiment is provided with a sufficient resolution. Further, as shown in FIGS. 3A, 3B and 3C, the wide angle lens 100 in this embodiment is provided with a sufficient resolution over a wide temperature range from −40° C. through +115° C.

Principal Effects in this Embodiment

As described above, in the wide angle lens 100 in this embodiment, four plastic lenses and two glass lenses are used together and thus, in comparison with a case that all lenses are glass lenses, the cost can be reduced. Further, one (fourth lens "L4") of the lenses (third lens "L3" and fourth lens "L4") disposed on both sides of the diaphragm 60 is a glass lens and thus the temperature characteristics can be improved. Further, the center curvature radius "R42" of the convex surface (tenth face 10) on the image side "Lb" of the fourth lens "L4" and the entire focal length "f0" satisfy the first conditional expression and thus an angle formed by the outermost light of a light flux and the image side face of the fourth lens "L4" is close to a right angle. Therefore, a moving amount of a focal point when the temperature is varied can be reduced and a variation amount of a viewing angle when the temperature is varied can be reduced. Accordingly, a stable characteristic can be obtained over a wide temperature range.

Further, the center curvature radius "R41" of the convex surface (the ninth face 9) on the object side "La" of the fourth lens "L4" and the center curvature radius "R42" of the convex surface (tenth face 10) on its image side "Lb" satisfy the second conditional expression and thus various aberrations can be corrected appropriately. Further, since the refractive index "nd" of the fourth lens "L4" is relatively small, the absolute value of the center curvature radius "R42" of the convex surface (tenth face 10) on the image side "Lb" is smaller than (5×f0). Therefore, occurrence of a ghost can be suppressed between the convex surface (ninth face 9) on the object side "La" of the fourth lens "L4" and the imaging element 80.

Further, in this embodiment, a lens whose refractive index "nd" is large is used as the first lens "L1". However, even in a case that the refractive index "nd" of the first lens "L1" is set to be smaller for further reducing the chromatic aberration, the center thickness "T6" of the sixth lens "L6" and the peripheral thickness "C6" of a light effective area of the face on the object side "La" of the sixth lens "L6" are set to satisfy the third conditional expression so as to be capable of reducing the magnification chromatic aberration effectively. In other words, since the first lens "L1" is a glass lens, basically, as the Abbe number "vd" becomes larger, the magnification chromatic aberration can be reduced. However, in a case that the Abbe number "vd" is large, the refractive index "nd" becomes small and thus an effective diameter of the first lens "L1" is required to be increased. On the other hand, there may be a case that an effective diameter of the first lens "L1" is required to reduce due to a restriction of an outer diameter dimension of the lens unit and, in this case, the radius of curvature of the first lens "L1" is required to make small. As a result, although the magnification chromatic aberration becomes large, when the center thickness "T6" and the peripheral thickness "C6" of the sixth lens "L6" satisfy the third conditional expression, the chromatic aberration can be corrected appropriately.

Second Embodiment

Figure 4A:
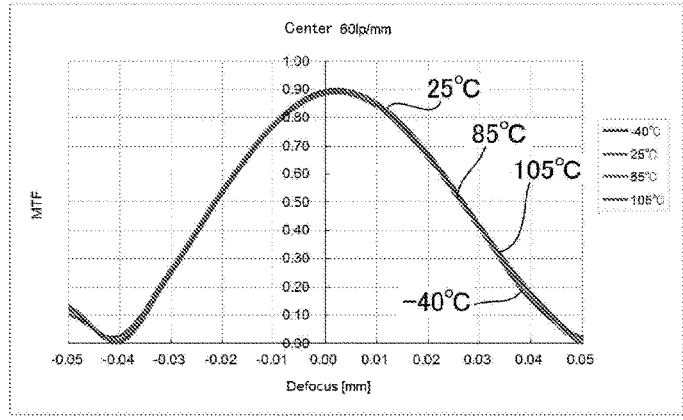
FIGS. 4A, 4B and 4C are graphs showing temperature characteristics of MTF characteristics of a wide angle lens in accordance with a second embodiment of the present invention.
Figure 4B:
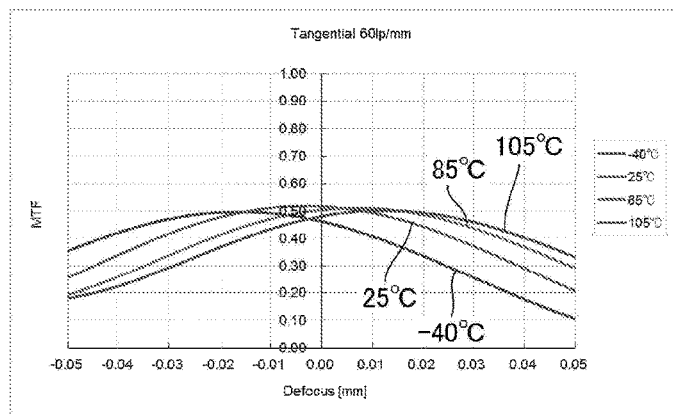
Figure 4C:
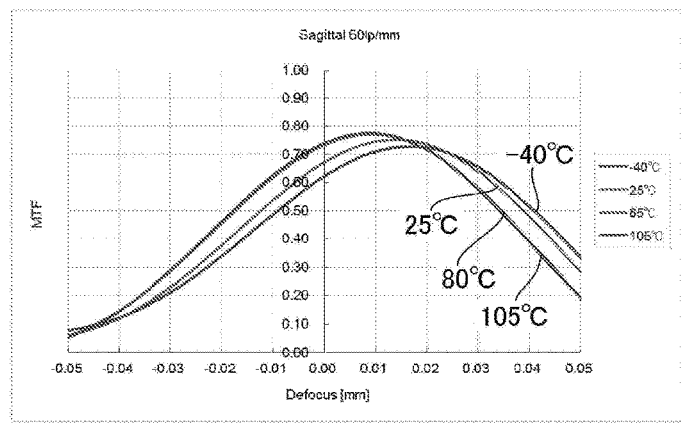

FIGS. 4A, 4B and 4C are graphs showing MTF characteristics of a wide angle lens 100 in accordance with a second embodiment of the present invention. FIG. 4A is a graph showing MTF characteristics at the center, FIG. 4B is a graph showing MTF characteristics in a tangential direction, and FIG. 4C is a graph showing MTF characteristics in a sagittal direction. In FIGS. 4A, 4B and 4C, characteristics are shown at respective temperatures of −40° C., +25° C., +80° C. and +105° C. Table 4 shows lens data of a wide angle lens 100 in accordance with the second embodiment of the present invention. Basic constitutions of wide angle lenses 100 in accordance with this embodiment and a third embodiment described below are similar to the first embodiment and thus the same reference signs are used in common portions and their detailed descriptions are omitted.

TABLE 4

| Face No. | | Center Curvature Radius | Thickness | Refractive Index nd | Abbe Coefficient Number vd | Conical Expansion K | Linear Coefficient ICE × 10^−6 |
|---|---|---|---|---|---|---|---|
| 1 | | Infinity | Infinity | | | | |
| 2 | LENS-L1 | 11.80000 | 1.300 | 1.7725 | 49.62 | | 60 |
| 3 | | 3.26585 | 1.204 | | | | 26 |
| 4 | LENS-L2 | 10.87970 | 0.600 | 1.5123 | 56.3 | 0 | 62 |
| 5 | | 1.23603 | 1.620 | | | −3.81E−01 | 62 |
| 6 | LENS-L3 | −3.41613 | 1.807 | 1.6355 | 23.97 | 0 | 62 |
| 7 | | −1.89707 | 0.256 | | | 0 | 60 |
| 8 | Diaphragm | Infinity | 0.115 | | | | 26 |
| 9 | LENS-L4 | 9.38142 | 1.346 | 1.8042 | 46.503 | | 70 |
| 10 | | −2.79377 | 0.083 | | | | 26 |
| 11 | LENS-L5 | −5.77863 | 0.500 | 1.6355 | 23.97 | 0 | 66 |
| 12 | Adhesive | 1.18145 | 0.010 | 1.4858 | 56.09 | −3.53E−01 | 60 |
| 13 | LENS-L6 | 1.18145 | 1.960 | 1.5439 | 56.19 | −3.53E−01 | 62 |
| 14 | | −2.10012 | 0.850 | | | 0 | 26 |
| 15 | | Infinity | 0.700 | 1.5168 | 64.17 | | 0 |
| 16 | | Infinity | 0.140 | | | | 26 |

| # | A4 | A6 | A8 | A10 |
|---|---|---|---|---|
| 4 | 1.30766E−02 | −1.35302E−03 | 3.29535E−05 | 3.21690E−06 |
| 5 | −2.34651E−02 | 3.34249E−02 | −1.15859E−02 | 1.11701E−03 |
| 6 | −4.20531E−02 | 1.03043E−02 | −8.99166E−03 | 3.29724E−03 |
| 7 | 2.86159E−02 | −2.80829E−03 | 3.44146E−03 | −3.25572E−04 |
| 11 | 3.16546E−02 | −4.19135E−02 | 1.74025E−02 | −2.11622E−03 |

TABLE 4-continued

| 12 | 2.77215E−01 | −3.89201E−01 | 2.01068E−01 | −4.81345E−02 |
| 13 | 2.77215E−01 | −3.89201E−01 | 2.01068E−01 | −4.81345E−02 |
| 14 | 3.28841E−02 | 1.23972E−02 | −6.10574E−03 | 1.64077E−03 |

In the wide angle lens 100 in the second embodiment, a center curvature radius "R42" of a convex surface (tenth face 10) on the image side "Lb" of the fourth lens "L4" is −2.79377 mm. Further, the focal length "f0" of the entire wide angle lens 100 (effective focal length) is 0.8755 mm. Therefore, the center curvature radius "R42" and the focal length "f0" of the entire wide angle lens 100 satisfy the following first conditional expression:

$(2 \times f0)=1.751 \leq |R42|=2.79377 \leq (5 \times f0)=4.3775.$

Further, the center curvature radius "R41" of a convex surface (ninth face 9) on the object side "La" of the fourth lens "L4" is 9.38142 mm. Therefore, the center curvature radii "R41" and "R42" satisfy the following second conditional expression:

$|R41|=9.38142 \geq |R42|\approx 2.79377$

Further, the center thickness "T6" of the sixth lens "L6" is 1.961 mm and the peripheral thickness "C6" of a light effective area of the convex surface (thirteenth face 13) on the object side "La" of the sixth lens "L6" is 0.7259 mm. Therefore, the center thickness "T6" and the peripheral thickness "C6" satisfy the following third conditional expression:

$2 \leq (T6/C6)=2.7015 \leq 3$

Further, the Abbe number "v5" of the fifth lens "L5" is 23.97, and the Abbe number "v6" of the sixth lens "L6" is 56.19. Therefore, the Abbe number "v5" of the fifth lens "L5" and the Abbe number "v6" of the sixth lens "L6" satisfy the following fourth conditional expression:

$v5 \leq 30$, and $v6 \geq 50.$

Therefore, the chromatic aberration can be corrected appropriately.

Further, the object-image distance "D" is 12.492 mm and the focal length "f0" of the entire lens system is 0.8755 mm. Therefore, the object-image distance "D" and the focal length "f0" of the entire lens system satisfy the following fifth conditional expression:

$10 < D/f0=14.268 < 18.$

In this case, the "D/f0" is larger than 10 and thus corrections of the spherical aberration and the distortion aberration can be performed easily. Further, the "D/f0" is less than 18 and thus a dimension (object-image distance) in the optical axis direction of the wide angle lens 100 can be shortened.

Therefore, as shown in Table 5 and FIGS. 4A, 4B and 4C, the wide angle lens 100 in the second embodiment is capable of attaining similar effects to the first embodiment. Table 5 shows viewing angle-temperature characteristics of the wide angle lens 100 in accordance with the second embodiment of the present invention and shows variations of a viewing angle from the temperature of 25° C. As shown in Table 5, in the wide angle lens 100 in this embodiment, variations of a vertical viewing angle, a horizontal viewing angle and a diagonal viewing angle are small over a wide temperature range from −40° C. to +105° C.

TABLE 5

| Temperature (° C.) | Vertical Viewing Angle (deg) | Horizontal Viewing Angle (deg) | Diagonal Viewing Angle (deg) |
|---|---|---|---|
| −40 | 1.09 | 1.66 | 2.61 |
| 25 | 0.00 | 0.00 | 0.00 |
| 80 | −0.96 | −1.39 | −2.01 |
| 105 | −1.31 | −1.92 | −2.77 |

As shown in FIGS. 4A, 4B and 4C, the wide angle lens 100 in this embodiment is provided with a sufficient resolution. Further, as shown in FIGS. 4A, 4B and 4C, the wide angle lens 100 in this embodiment is provided with a sufficient resolution over a wide temperature range from −40° C. through +105° C.

Third Embodiment

Figure 5A:
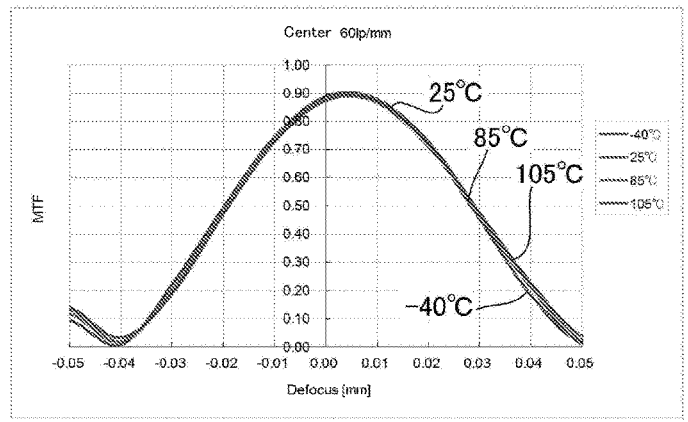
FIGS. 5A, 5B and 5C are graphs showing temperature characteristics of MTF characteristics of a wide angle lens in accordance with a third embodiment of the present invention.
Figure 5B:
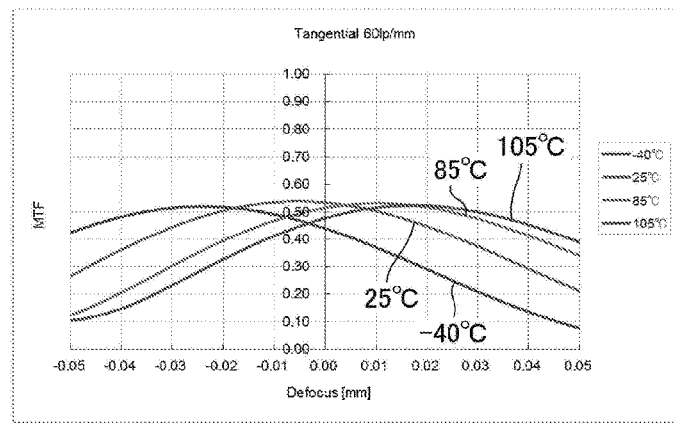
Figure 5C:
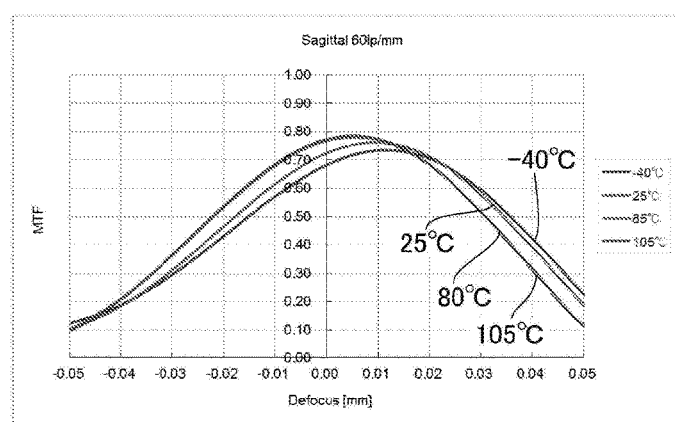

FIGS. 5A, 5B and 5C are graphs showing MTF characteristics of a wide angle lens 100 in accordance with a third embodiment of the present invention. FIG. 5A is a graph showing MTF characteristics at the center, FIG. 5B is a graph showing MTF characteristics in a tangential direction, and FIG. 5C is a graph showing MTF characteristics in a sagittal direction. In FIGS. 5A, 5B and 5C, characteristics are shown at respective temperatures of −40° C., +25° C., +80° C. and +105° C. Table 6 shows lens data of a wide angle lens 100 in accordance with the third embodiment of the present invention.

TABLE 6

| Face No. | | Center Curvature Radius | Thickness | Refractive Index nd | Abbe Number vd | Conical Coefficient K | Linear Expansion Coefficient TCE × 10^−6 |
|---|---|---|---|---|---|---|---|
| 1 | | Infinity | Infinity | | | | |
| 2 | LENS-L1 | 11.91359 | 1.300 | 1.7725 | 49.62 | | 60 |
| 3 | | 3.27629 | 1.231 | | | | 26 |
| 4 | LENS-L2 | 10.54069 | 0.600 | 1.5123 | 56.3 | 0 | 62 |
| 5 | | 1.20981 | 1.576 | | | −3.79E−01 | 62 |
| 6 | LENS-L3 | −3.57864 | 1.851 | 1.6355 | 23.97 | 0 | 62 |
| 7 | | −1.83347 | 0.215 | | | 0 | 60 |
| 8 | Diaphragm | Infinity | 0.082 | | | | 26 |
| 9 | LENS-L4 | 11.59593 | 1.364 | 1.7292 | 54.67 | | 70 |

TABLE 6-continued

| | | | | | | | |
|---|---|---|---|---|---|---|---|
| 10 | | −2.40993 | 0.089 | | | | 26 |
| 11 | LENS-L5 | −5.18778 | 0.500 | 1.6355 | 23.97 | 0 | 66 |
| 12 | Adhesive | 1.21738 | 0.010 | 1.4858 | 56.09 | −3.37E−01 | 60 |
| 13 | LENS-L6 | 1.21738 | 1.984 | 1.5439 | 56.19 | −3.37E−01 | 62 |
| 14 | | −2.05847 | 0.850 | | | 0 | 26 |
| 15 | | Infinity | 0.700 | 1.5168 | 64.17 | | 0 |
| 16 | | Infinity | 0.140 | | | | 26 |

| # | A4 | A6 | A8 | A10 |
|---|---|---|---|---|
| 4 | 8.60299E−03 | −8.86478E−04 | 4.98118E−05 | 9.88269E−07 |
| 5 | −3.71711E−02 | 3.52610E−02 | −2.09869E−02 | 3.55894E−03 |
| 6 | −5.02580E−02 | 1.13561E−02 | −7.67446E−03 | 3.04049E−03 |
| 7 | 3.20874E−02 | 3.97195E−03 | −4.06866E−03 | 2.81061E−03 |
| 11 | 2.98777E−02 | −4.04031E−02 | 1.66235E−02 | −2.26322E−03 |
| 12 | 2.64490E−01 | −3.62970E−01 | 1.82911E−01 | −4.14883E−02 |
| 13 | 2.64490E−01 | −3.62970E−01 | 1.82911E−01 | −4.14883E−02 |
| 14 | 3.60128E−02 | 9.85629E−03 | −4.17469E−03 | 9.77731E−04 |

In the wide angle lens 100 in the third embodiment, a center curvature radius "R42" of a convex surface (tenth face 10) on the image side "Lb" of the fourth lens "L4" is −2.40993 mm. Further, the focal length "f0" of the entire wide angle lens 100 (effective focal length) is 0.87487 mm. Therefore, the center curvature radius "R42" and the focal length "f0" of the entire wide angle lens 100 satisfy the following first conditional expression:

$(2 \times f0) = 1.74974 \leq |R42| = 2.40993 \leq (5 \times f0) = 4.37435.$

Further, the center curvature radius "R41" of a convex surface (ninth face 9) on the object side "La" of the fourth lens "L4" is 11.59593 mm. Therefore, the center curvature radii "R41" and "R42" satisfy the following second conditional expression:

$|R41| = 11.59593 \geq |R42| = 2.40993.$

Further, the center thickness "T6" of the sixth lens "L6" is 1.984 mm, and the peripheral thickness "C6" of a light effective area of the convex surface (thirteenth face 13) on the object side "La" of the sixth lens "L6" is 0.7226 mm. Therefore, the center thickness "T6" and the peripheral thickness "C6" satisfy the following third conditional expression:

$2 \leq (T6/C6) = 2.7456 \leq 3.$

Further, the Abbe number "v5" of the fifth lens "L5" is 23.97, and the Abbe number "v6" of the sixth lens "L6" is 56.19. Therefore, the Abbe number "v5" of the fifth lens "L5" and the Abbe number "v6" of the sixth lens "L6" satisfy the following fourth conditional expression:

$v5 \leq 30$, and $v6 \geq 50.$

Therefore, the chromatic aberration can be corrected appropriately.

Further, the object-image distance "D" is 12.491 mm and the focal length "f0" of the entire lens system is 0.87487 mm. Therefore, the object-image distance "D" and the focal length "f0" of the entire lens system satisfy the following fifth conditional expression:

$10 < D/f0 = 14.278 < 18.$

In this case, the "D/f0" is larger than 10 and thus corrections of the spherical aberration and the distortion aberration can be performed easily. Further, the "D/f0" is less than 18 and thus a dimension (object-image distance) in the optical axis direction of the wide angle lens 100 can be shortened.

Therefore, as shown in Table 7 and FIGS. 5A, 5B and 5C, the wide angle lens 100 in the third embodiment is capable of attaining similar effects to the first embodiment. Table 7 shows viewing angle-temperature characteristics of the wide angle lens 100 in accordance with the third embodiment of the present invention and shows variations of a viewing angle from the temperature of 25° C. As shown in Table 7, in the wide angle lens 100 in this embodiment, variations of a vertical viewing angle, a horizontal viewing angle and a diagonal viewing angle are small over a wide temperature range from −40° C. to +105° C.

TABLE 7

| Temperature (° C.) | Vertical Viewing Angle (deg) | Horizontal Viewing Angle (deg) | Diagonal Viewing Angle (deg) |
|---|---|---|---|
| −40 | 1.09 | 1.55 | 2.36 |
| 25 | 0.00 | 0.00 | 0.00 |
| 80 | −0.96 | −1.30 | −1.83 |
| 105 | −1.31 | −1.80 | −2.52 |

As shown in FIGS. 5A, 5B and 5C, the wide angle lens 100 in this embodiment is provided with a sufficient resolution. Further, as shown in FIGS. 5A, 5B and 5C, the wide angle lens 100 in this embodiment is provided with a sufficient resolution over a wide temperature range from −40° C. through +105° C.

Other Embodiment

In the embodiments described above, the first lens "L1" is a glass lens. However, the present invention may be applied to a case that the first lens "L1" is a plastic lens.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A wide angle lens, comprising:
a first lens, a second lens, a third lens, a diaphragm, a fourth lens, a fifth lens and a sixth lens which are disposed in order from an object side, wherein
the first lens is a negative meniscus lens whose convex surface is directed to the object side;
the second lens is a negative meniscus lens whose convex surface is directed to the object side;
the third lens is a positive meniscus lens whose concave surface is directed to the object side;
the fourth lens is a positive lens whose convex surfaces are directed to the object side and an image side;
the fifth lens is a negative lens whose concave surfaces are directed to the object side and the image side;
the sixth lens is a positive lens whose convex surfaces are directed to the object side and the image side;
the fourth lens is a glass lens;
the second lens, the third lens, the fifth lens and the sixth lens are plastic lenses;
the fifth lens and the sixth lens constitute a cemented lens which is constituted so that an image side face of the fifth lens and an object side face of the sixth lens are joined to each other with an adhesive; and
when a center curvature radius on an image side face of the fourth lens is "R42" and a focal length of an entire wide angle lens is "f0", the center curvature radius "R42" and the focal length "f0" satisfy the following conditional expression:

$2 \times f0 \leq |R42| \leq 5 \times f0$.

2. The wide angle lens according to claim 1, wherein
when a center curvature radius on an object side face of the fourth lens is "R41", the center curvature radii "R41" and "R42" satisfy the following conditional expression:

$|R41| \geq |R42|$.

3. The wide angle lens according to claim 2, wherein the first lens is a glass lens.

4. The wide angle lens according to claim 3, wherein
when a center thickness of the sixth lens is "T6" and a peripheral thickness of a light effective area on an object side face of the sixth lens is "C6", the center thickness "T6" and the peripheral thickness "C6" satisfy the following conditional expression:

$2 \leq (T6/C6) \leq 3$.

5. The wide angle lens according to claim 4, wherein
an Abbe number "ν5" of the fifth lens and an Abbe number "ν6" of the sixth lens satisfy the following conditional expression:

$\nu5 \leq 30$, and $\nu6 \geq 50$.

6. The wide angle lens according to claim 5, wherein
an object-image distance "D" and the focal length "f0" satisfy the following conditional expression:

$10 < D/f0 < 18$.

7. The wide angle lens according to claim 2, wherein
when a center thickness of the sixth lens is "T6" and a peripheral thickness of a light effective area on an object side face of the sixth lens is "C6", the center thickness "T6" and the peripheral thickness "C6" satisfy the following conditional expression:

$2 \leq (T6/C6) \leq 3$.

8. The wide angle lens according to claim 2, wherein
an Abbe number "ν5" of the fifth lens and an Abbe number "ν6" of the sixth lens satisfy the following conditional expression:

$\nu5 \leq 30$, and $\nu6 \geq 50$.

9. The wide angle lens according to claim 2, wherein
an object-image distance "D" and the focal length "f0" satisfy the following conditional expression:

$10 < D/f0 < 18$.

10. The wide angle lens according to claim 1, wherein the first lens is a glass lens.

11. The wide angle lens according to claim 10, wherein
when a center thickness of the sixth lens is "T6" and a peripheral thickness of a light effective area on an object side face of the sixth lens is "C6", the center thickness "T6" and the peripheral thickness "C6" satisfy the following conditional expression:

$2 \leq (T6/C6) \leq 3$.

12. The wide angle lens according to claim 11, wherein
an Abbe number "ν5" of the fifth lens and an Abbe number "ν6" of the sixth lens satisfy the following conditional expression:

$\nu5 \leq 30$, and $\nu6 \geq 50$.

13. The wide angle lens according to claim 12, wherein
an object-image distance "D" and the focal length "f0" satisfy the following conditional expression:

$10 < D/f0 < 18$.

* * * * *